United States Patent [19]
Palmers et al.

[11] Patent Number: 5,348,697
[45] Date of Patent: Sep. 20, 1994

[54] METHOD AND APPARATUS FOR THE PRODUCTION OF REINFORCED PLASTIC OBJECTS

[75] Inventors: Göran Palmers, Askim; Max Maupoix, Goteborg, both of Sweden

[73] Assignee: Institutet För Verkstadsteknisk Forskning, Goteborg, Sweden

[21] Appl. No.: 30,471

[22] PCT Filed: Oct. 3, 1991

[86] PCT No.: PCT/SE91/00663
§ 371 Date: Apr. 2, 1993
§ 102(e) Date: Apr. 2, 1993

[87] PCT Pub. No.: WO92/05937
PCT Pub. Date: Apr. 16, 1992

[30] Foreign Application Priority Data
Oct. 4, 1990 [SE] Sweden .................... 9003184.0

[51] Int. Cl.[5] .................. B29C 39/02; B29C 39/42
[52] U.S. Cl. .................. 264/102; 55/DIG. 46; 118/326; 264/309; 425/74; 425/96; 425/150; 425/470; 427/421; 427/236; 454/50; 901/1
[58] Field of Search ............... 264/101, 102, 257, 258, 264/40.2, 517, 40.5, 121, 40.6, 309, 324; 425/73, 74, 75, 143, 149, 96, 80.1, 470, 150; 118/326; 427/421, 236; 454/50, 51, 52, 53, 54; 901/1; 55/DIG. 46

[56] References Cited
U.S. PATENT DOCUMENTS

| | | | |
|---|---|---|---|
| 3,664,786 | 5/1972 | Devine | 264/101 |
| 3,775,214 | 11/1973 | Winters | 264/102 |
| 3,999,911 | 12/1976 | Matsubara | 425/73 |
| 4,154,561 | 5/1979 | Virtanen | 425/73 |
| 4,205,031 | 5/1980 | Almqvist et al. | 264/102 |
| 4,799,873 | 1/1989 | Martin | 425/73 |
| 4,880,581 | 11/1989 | Dastoli et al. | 425/74 |

FOREIGN PATENT DOCUMENTS

| | | | |
|---|---|---|---|
| 227620 | 9/1985 | Fed. Rep. of Germany | 425/73 |
| 1009796 | 4/1983 | U.S.S.R. | 425/73 |

*Primary Examiner*—Mathieu Vargot
*Attorney, Agent, or Firm*—Klarquist, Sparkman, Campbell, Leigh & Whinston

[57] ABSTRACT

A method and apparatus for the production of reinforced plastic objects uses a body form around which a casing having a cover is placed. The cover includes two cover units which between them defines an opening having an adjustable size and position. The opening provides access into the body form so that reinforced plastic material may be applied therein. The size of the opening is minimized to reduce the amount of environmentally harmful substances escaping therefrom, such as styrene. The position and size of the opening relative to the body form is adjustable to provide a convenient access into the body form.

13 Claims, 6 Drawing Sheets

METHOD AND APPARATUS FOR THE PRODUCTION OF REINFORCED PLASTIC OBJECTS

BACKGROUND AND SUMMARY OF THE INVENTION

The industry producing products in reinforced plastic today have great demands of improving both the internal and external environment, and for this to be possible the emissions of styrene have to be reduced.

One way to achieve this is to improve previously used production methods or offer new such methods. The application of plastic material traditionally is carried out by spraying and rolling or by manual application, and by filling and inlay of reinforcement fabric or mats and distance material.

Production by spraying and laying up is carried out preferably in conventional spray boxes, which demand large air flows. This in turn results in a large heating demand, which leads to high heating costs and problems finding sufficiently low cost gas purifier plants.

One object of the present invention is to provide a method for producing large plastic objects in a simple and reliable way.

Another object of the present invention is to provide a method for producing plastic components which is substantially harmless to the environment.

Yet another object is to provide a method for producing plastic components that is energy efficient.

The present invention comprises a method and apparatus for producing plastic components with minimal escape of harmful substances into the environment. The apparatus includes a casing placed over a hollow body form. The casing includes a cover which defines an opening having an adjustable size and position. The opening provides access into the body form so that reinforced plastics may be applied therein. The size of the opening may be minimized to reduce the amount of harmful substances, such as styrene, escaping from the body form. The position of the opening relative to the body form is adjustable to provide a convenient access into the body form when reinforced plastics are applied therein.

DESCRIPTION OF THE DRAWINGS

In the following the invention will be described in closer detail with reference to diagrammatically shown embodiments in the accompanying drawings.

DESCRIPTION OF PREFERRED EMBODIMENTS

Figure 1:
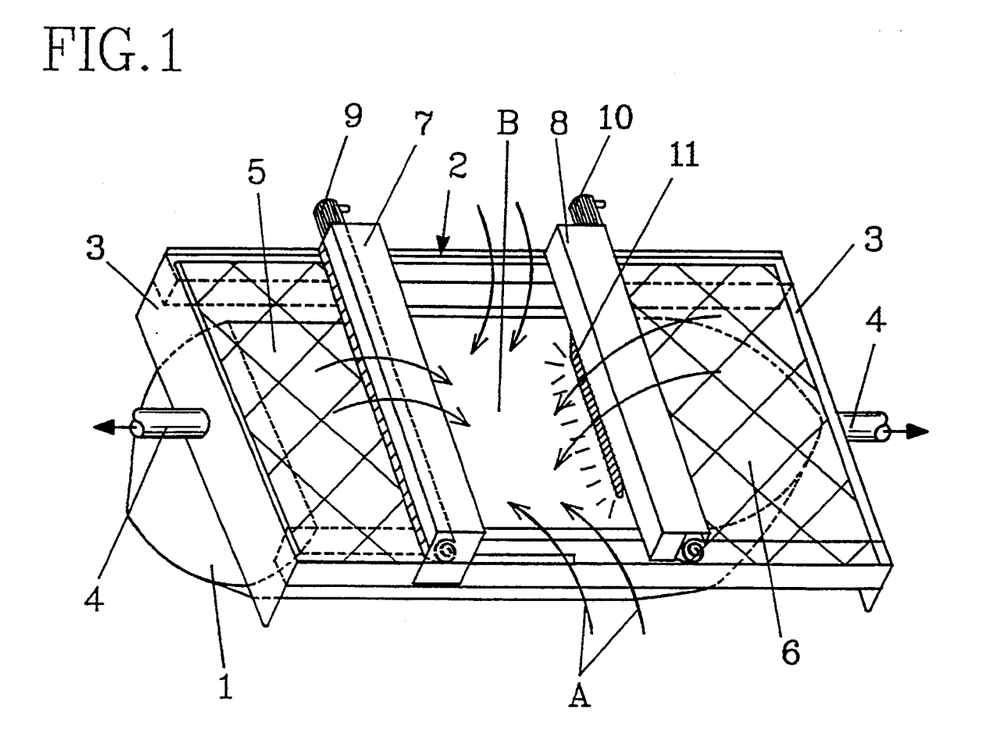
FIG. 1 shows in perspective view a device according to the invention for the production of a ship body with the method according to the invention.

The invention is illustrated in FIG. 1 in connection with production of a ship body by means of a body form 1, around the open side of which is arranged a frame formed casing 2, which in the example shown is rectangular and completely encloses the open side of the form. At the opposite short sides 3 of the casing 2 are provided exhaust terminal devices 4 connected to a plant not shown by means of which the exhaust air is cleaned and out of which heat can be retrieved.

The upper open side of the casing 2 in the example shown is provided with two covering units 5, 6, e.g. in the form of flexible webs, e.g. cloths of polytetrafluorethylene or the like which are individually windable on rolls provided in parallelepipedal housings 7, 8, which extend over the opening of the casing in the cross direction, and which can be driven in the longitudinal direction of the casing on the longitudinal edges driven by separate electric motors 9, 10. The housings 7, 8 are preferably provided with illumination 11.

When the device is used, the housings 7, 8 by means of the motors 9,10 are placed at a mutual distance, which is adapted after least possible space which is needed in order to reach the inside of the form 1 by passing the free opening between the housings 7, 8 to put in reinforcement, distance material and the like and to apply plastic material by means of spraying or a wetting roll (not shown). Thereby the size of the opening between the housings 7, 8 can be varied between a maximum opening, where each housing is located at the opposite short sides 3 of the casing 2, and a completely closed opening where the housings 7, 8 are placed against each other, and where the covers 5,6 thereby cover the whole opening. This position (not shown) preferably can be used when the object is going to cure after termination of the material application, whereby also the flow velocity in the exhaust terminal devices preferably can be reduced. Since the both housings are individually movable on the upper side of the casing, it is not only possible to vary the size of the opening, but also to vary the position of the opening such that the mininum necessary work opening can be moved from a short side of the plastic application area, that is the inside of the form, to the other short side under maintaining of the size of the opening, or if required with a change of the size of the opening. The size of the opening B preferably can be controlled automatically to an empirically appropriate value and the position of the opening along the length of the casing preferably is controlled by photo cells not shown or similar sensors in relation to the movements of an operator or the movements of a working tool. By practical tests it has shown that at manual work such as spraying it is sufficient with a work opening of about 3 m length, and it has also shown, that the concentration of styrene just outside the casing at such an opening is about a tenth of the corresponding concentration if the work is carried out in a completely open form, and this with an air flow in the exhaust air, which corresponds to 10–20% of the air flow in an equivalent spray box. In FIG. 1 is illustrated with the arrows A how the air in the room where the device is placed is sucked in through the opening, which is designated B and thereby gives a laminar air flow as much as possible, which to a great extent prevents the styrene vapor from leaving the casing 2 and the form 1 through the opening B between the cover units 5, 6. Through the lighting 11 arranged on one or on both housings 7,8, a satisfactory lighting of the working area is obtained irrespective of the movement of the same in the longitudinal direction of the body form.

Figure 2:
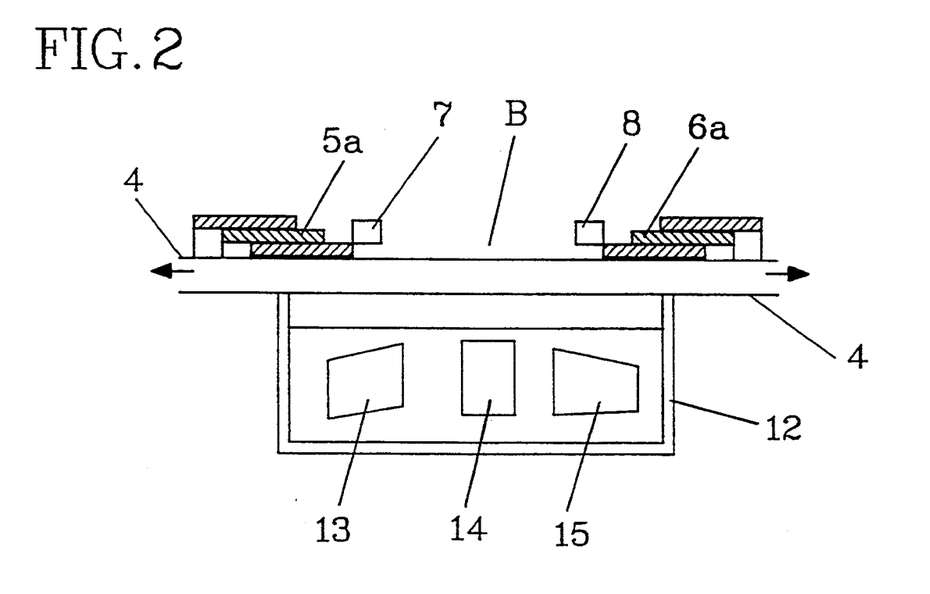
FIG. 2 is a longitudinal section through a variant of the device according to FIG. 1 intended for the production of smaller objects.

In FIG. 2 is shown a longitudinal cross section of a modified design of the device according to the invention, whereby the casing 2 cooperates with a box-shaped space 12, which corresponds the body form 1 in the embodiment according to FIG. 1 and in which space is indicated the objects 13,14,15 produced which are fixed in the space. In this case the form itself does not constitute part of the closed space, such as in the case according to FIG. 1, but for the rest the corresponding details with corresponding reference designations are of similar design. As can be seen from this view, the covering units 5a,6a, are located at a distance above the air terminal exhaust devices 4, which has shown to be important not only in this embodiment, since in the exhaust air there will be turbulence caused by the spraying if the cover is close to the air terminal exhaust devices. However, by locating the cover at a distance above the air terminal exhaust devices a disturbance free laminar flow is obtained. The cover units 5a, 6a in this case are designed differently from those in FIG. 1 and here is of a type, which will be described in closer detail in connection with FIG. 10.

Figure 3:
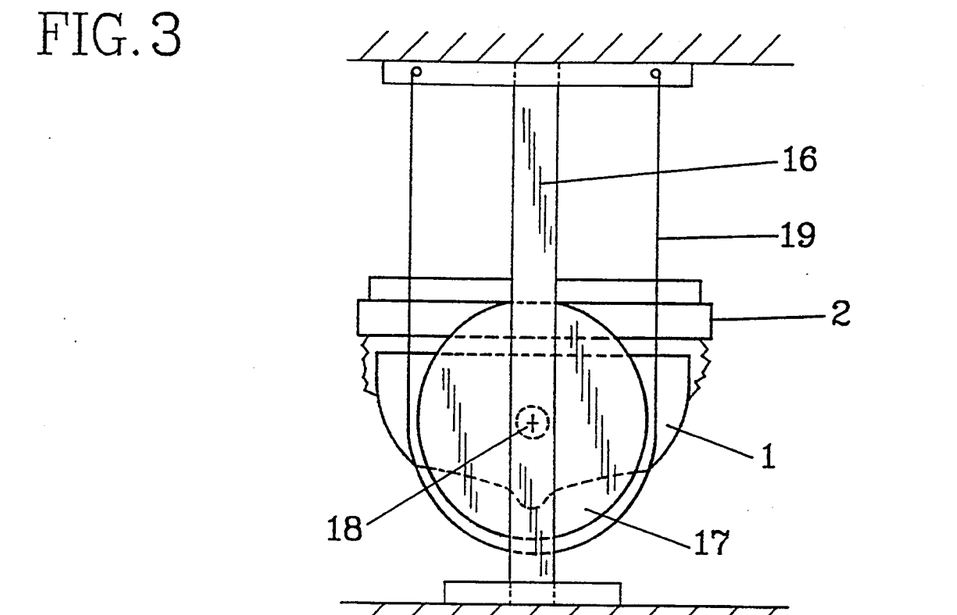
FIG. 3 shows a view from the end of a modified design of the device according to the invention.
Figure 4:
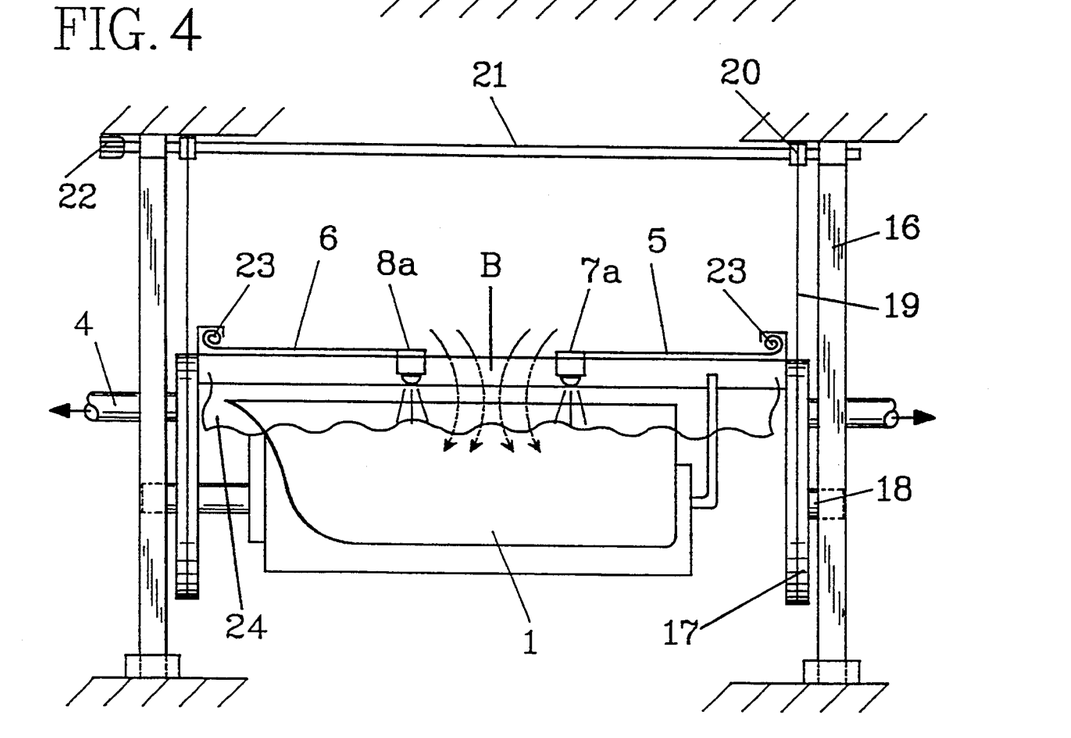
FIG. 4 is a lateral view of the device according to FIG. 3.
Figure 5:
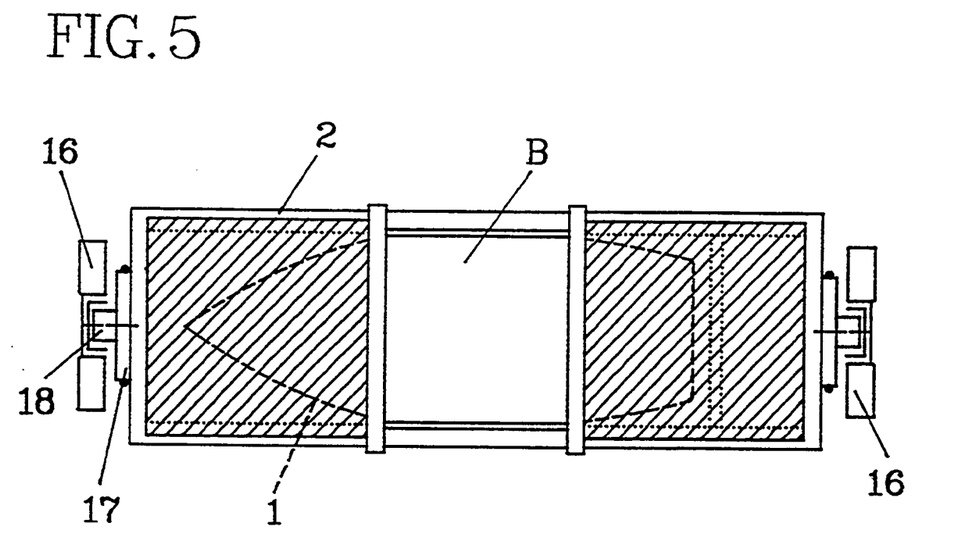
FIG. 5 shows a view from the above of the device according to FIG. 3.

In FIGS. 3, 4 and 5 is shown an end view, a side view and a view from the above of a device suspended in a rack 16 according to the invention, whereby the rack 16 in the example shown extends between floor and ceiling and comprises U-formed beams (see FIG. 5). The rack can as well be free-standing which means that the device can be placed freely. On the short sides of the device, which comprises the casing 2 and the body form 1, turn discs 17 are fixedly provided thereto, with shaft pivots extending therefrom, which are guided in the space between the shanks of the U-formed beam 16. The turn discs 17 are suspended in wires 19, which are guided over rolls 20 on longitudinal shafts 21, of which at least one is driven by a motor 22, by means of which the unit consisting of the body form 1 and the casing 2, with components connected thereto is vertically adjustable and moreover turnable about the shaft pivots 18 to give the operator an ergonomically correct working posture.

The covering units 5 and 6 correspond to those shown in FIG. 1, however their winding mechanism is modified with respect to the embodiment according to FIG. 1, in that the housings 7a and 8a only contain lighting and air supply terminal devices, while the winding mechanisms 23 instead are placed at the short sides of the casing. In these figures is also illustrated the arrangement of flexible sealings 24 provided to seal between the casing 2 and the body form 1, which reduces the risk of leakage of an atmosphere abundant of solvent.

Figure 6:
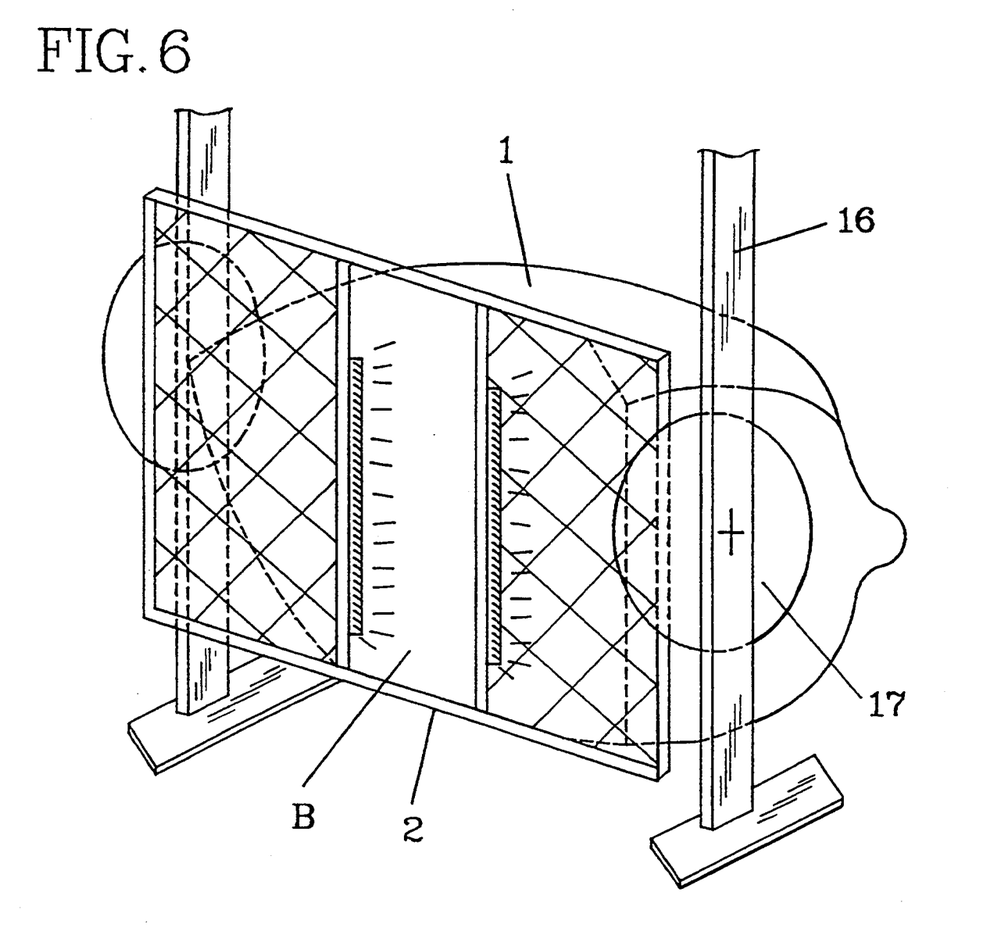
FIG. 6 is a perspective view of the device according to FIG. 3.

In FIG. 6 is illustrated in perspective view and diagrammatically how the device according to the invention comprising the body form 1 and the casing 2 can be turned in the rack 16 about the longitudinal mid axis, by means of the control system 17–22 according to FIG. 4, such that the opening B through which the working area is reached, can be located in a position which allows the person who is going to do the work to do so in a normal and comfortable posture.

Figure 7:
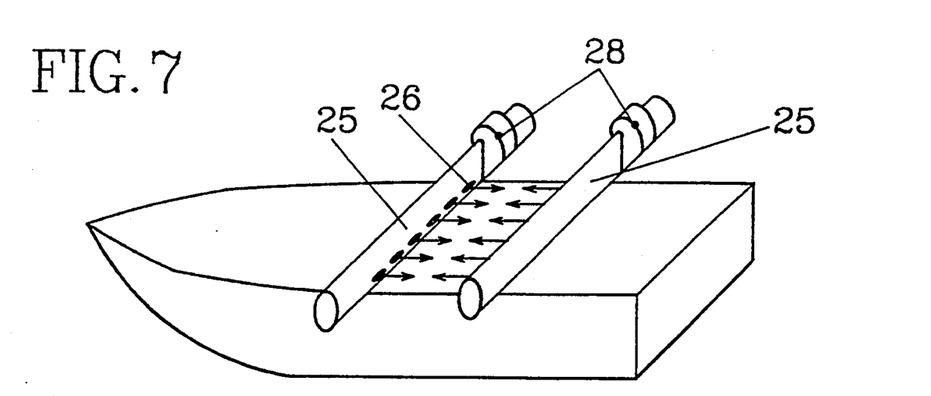
FIG. 7 and 8 show in perspective view two different designs of a supply air terminal device contained in the device according to the invention.
Figure 8:
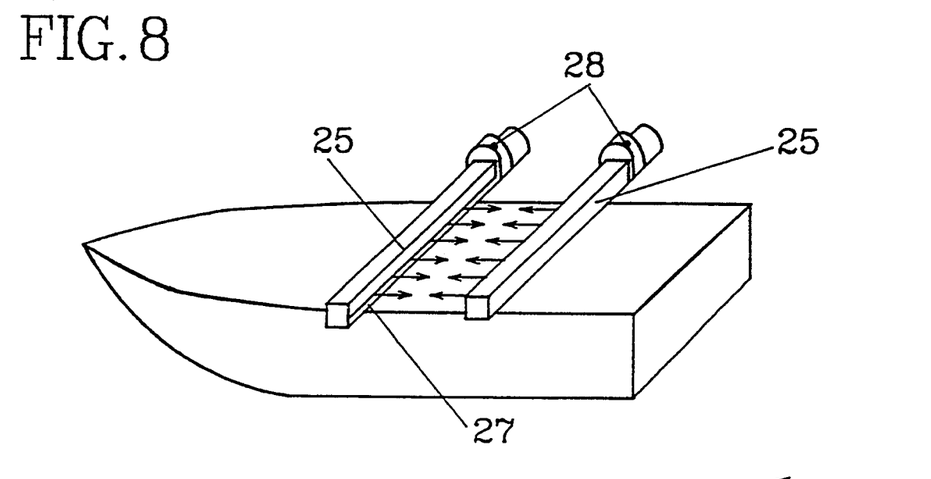

FIGS. 7 and 8 diagrammatically illustrate how the housing 25, which houses rolls for the windable covering units in accordance to FIG. 1 or lighting as well are designed as air supply terminal devices in accordance to FIG. 3, whereby in the case according to FIG. 7, nozzles 26 are directed inwards against the opening B between the housings 25 while in the case according to FIG. 8, slots 27 are directed in the same way. In both cases at one side of the housings is provided a ducted fan 28, which gives a suitable supply air velocity. By using such supply air terminal devices it can be achieved that a reflection of styrene vapor is blocked, simultaneously reducing the wake space that results behind an operator, who stands in or just outside the opening, to a minimum.

Figure 9:
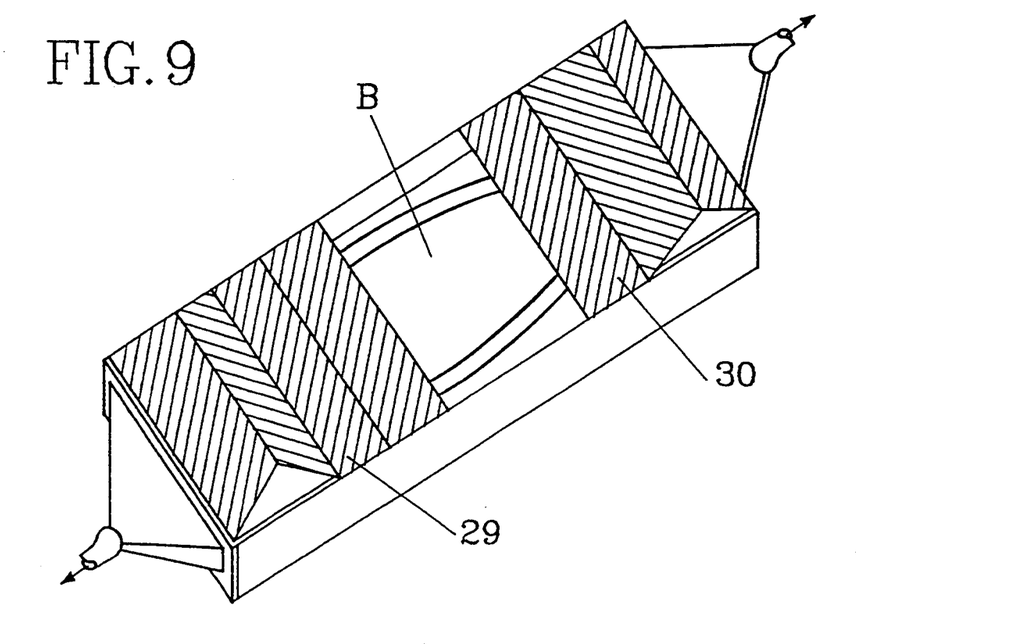
FIG. 9 shows in perspective view an alternative embodiment of the device according to the invention.

FIG. 9 is a perspective view obliquely from the above illustrating a device according to the invention with a modified design of the covering units 29, 30, which in the figure are shown as foldable doors, but which can also be of roll-front door type.

Figure 10:
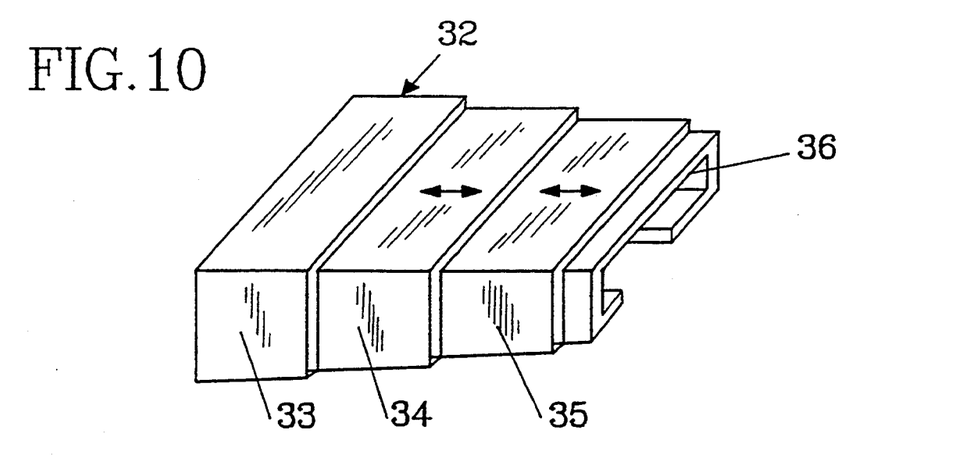
FIG. 10 shows a further alternative of covering for the device according to the invention.

FIG. 10 diagrammatically illustrates a part of a covering unit 32 of the type which is diagrammatically indicated in FIG. 2 and which consists of a number of partial sleeve formed elements 33, 34, 35 telescopically displaceable into each other and located along the upper side of a casing In connection to the front element 35 there is provided a beam 36 running in the cross direction which may be attached to the front element or be individually movable on the upper longitudinal edges of the casing not shown in this figure. The beam 36 constitutes a running path for a robot not shown in the figure, which robot thus can be moved together with the beam 36 in the longitudinal direction and be drivable on the beam 36 in the transversal direction, so that the robot easily can reach and operate over the whole temporary opening area.

Figure 11:
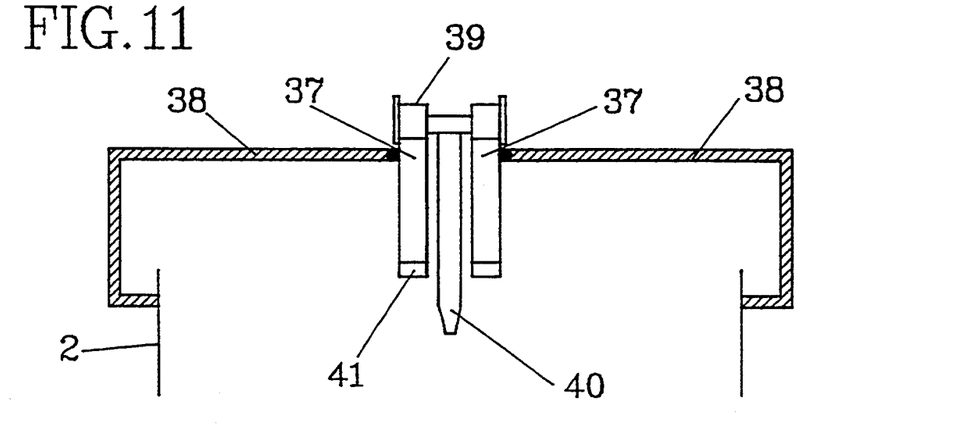
FIG. 11 shows in a diagrammatic sectional view of still another embodiment of the cover for the device according to the invention.

In FIG. 11 is illustrated in a cross section through the cover diagrammatically an alternative design of an easily robotizable device according to the invention.

In this case the cover is divided by two longitudinal beams 37, which extend centrally in the longitudinal direction over the whole casing 2 and between themselves form a slot. Hereby the cover is divided, which can be of the same type as that shown in FIG. 10 in a number of L-shaped, telescopically into each other sliding elements 38, which extend over half the width of the casing, whereby every single element 38 is individually settable, so that the openings at each sides of the beams 37 can have different positions and/or size according to present requirements and desiderata. The top side of the beams 37 are made as a running path for a carriage 39 which can be driven in the longitudinal direction of the beams, which carriage supports a robot 40, which extends through the slot between the beams 37, down into the space under the cover 38. The robot 40 thereby can be driven along the whole extension of the device and thereby serve the whole working area irrespective of the position of the opening or the degree of opening settable by the covers 38. The under side of the beams 37 preferably can be provided with lighting ramps 41, which preferably can be mounted with UV-lamps for setting of UV-setting plastic material.

Figure 12:
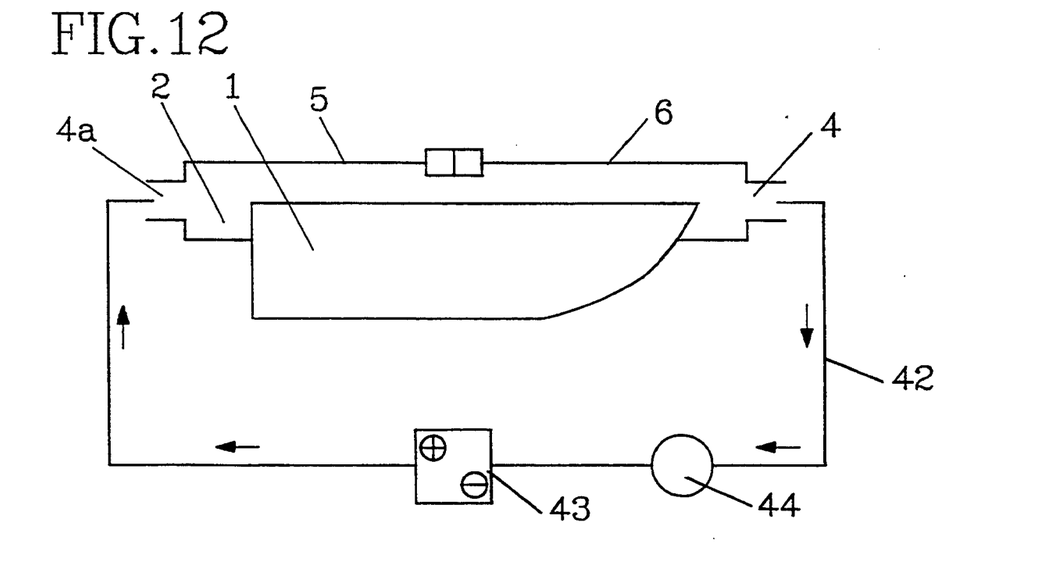
FIG. 12 shows diagrammatically the device according to the invention connected to an air circulation system.

In FIG. 12 is diagrammatically illustrated how a device according to the invention comprising a form 1, and a casing 2 with cover elements 5,6, which in the position shown are completely closed, is connected to a closed cycle. One of the exhaust terminal devices 4 is connected to a hose 42 with a pump 44 or the like, which transports the exhaust air through the hose and with a heat exchanger 43, by means of which the circulated air can be supplied with heat or cooled according to requirements, and which hose returns the air through the other exhaust terminal device 4a, which in this position serves as an air intake. This function can be used when the product is going to be cured, whereby e.g. plastic materials can be used which cure only at elevated temperature, e.g. at +30° C., so that during the plastic applying process at room temperature there is no risk of premature and uneven curing. After the application work, the cover units can be closed, and 30° C. preheated air can be fed in a closed cycle, whereby the curing starts.

Figure 13:
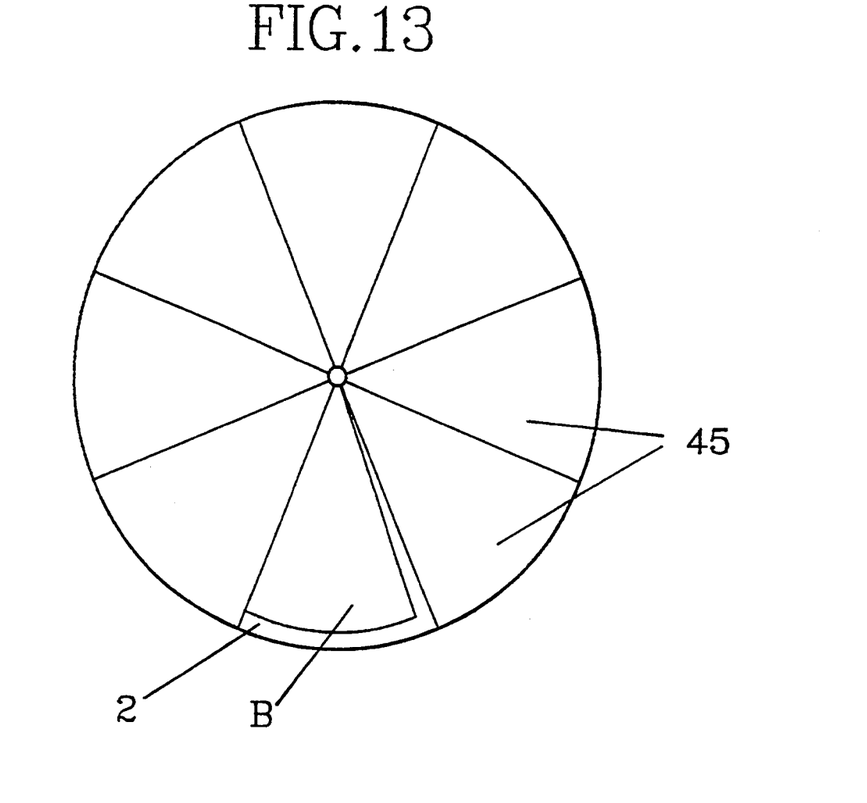
FIG. 13 shows diagrammatically in a view from the above a device according to the invention with circular basic form, and FIG. 14 in a diagrammatical sectional view a further modification where the device is designed in the shape of a hangar.

In FIG. 13 is shown diagramatically in a view from the above how the device, instead of the rectangular base form which has been shown in previous designs, can have a circular base form where the cover elements are constituted by sector formed elements 45, which are individually turnably movable around the center of the device by over or under lapping of adjacent elements. Hence, one or several openings B can be provided in an optional position around the periphery of the device, and optionally the underlying construction can be rotated so that different parts thereof come just in front of an opening or the person which carries out the plastic application can walk around the device concurrently with the advance of the application work.

Figure 14:
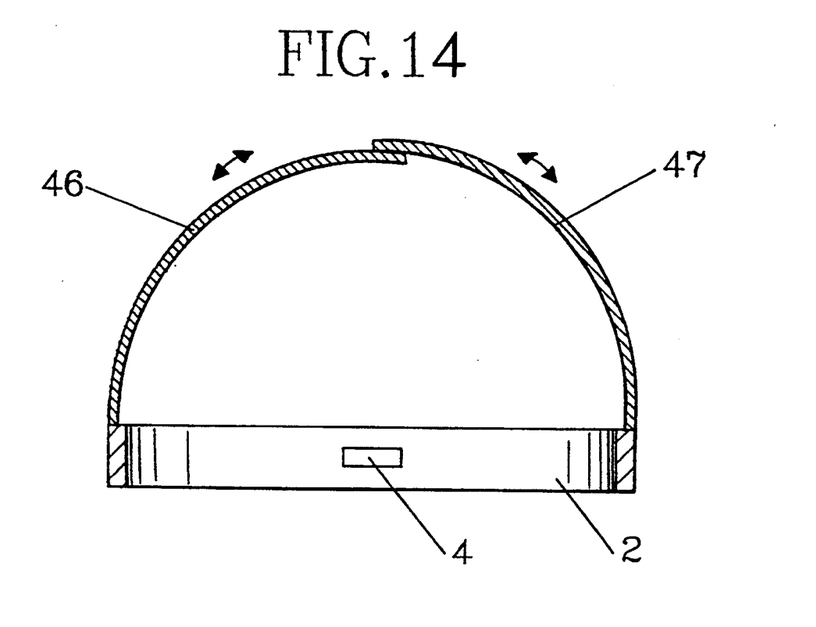

Finally FIG. 14 illustrates in cross section a further embodiment of the device, where the cover provided on the casing 2 has a shape of a hangar and consists of two quarter circular elements 46, 47, of which at least one and preferably both are pivotable and slidable towards the other in a way that is illustrated by arrows, so that an opening through which the inside of the casing can be reached is provided on optional sides of the device.

The invention is not limited to the embodiments shown in the accompanying drawings and in connection thereto described embodiments but modifications are possible within the scope of the following patent claims.

We claim:

1. A method for production of large objects of plastic material with minimal escape of harmful substances to the environment, the method comprising:

positioning a cover above a plastic application area, the cover including two cover units movable with respect to the plastic application area and each other to define an opening therebetween of an adjustable size and position, connecting exhaust air terminal devices below the cover, adjusting the size of the opening of the cover by manipulating the cover units, applying a plastic material to a body form in the application area through the opening in the cover, and simultaneously providing moderate air flow through the exhaust air terminal devices, and manipulating the cover units to adjust the size and position of the opening defined therebetween during the applying of the plastic material to minimize the size of the opening and thereby the escape of harmful substances to the environment.

2. A method according to claim 1, comprising arranging a cover comprising at least two covering units movably provided on a casing around the body form and displacing these covering units individually in order to simultaneously set the size of and the position of the opening along all the length of the cover.

3. An apparatus for production of large objects of plastic material with minimal escape of harmful substances to the environment comprising:

a body form;

a casing mountable on the body form;

a cover placed on a top side of the casing, the cover having two cover units movable with respect to the casing and each other to define an opening therebetween of an adjustable size and position; and application means for applying a plastic material to the body form through the opening, said body form located in a reinforced plastic material application area, the casing having an exhaust air terminal device ending in an interior of the casing, and with the cover sealing against upper edges of the casing, the two cover units being individually movable on the top side of the casing and the opening being freely adjustable to size and position.

4. An apparatus according to claim 3, wherein the cover units comprise flexible material cloths, which are windable from opposite short sides of the casing to an individual extent, in order to form said opening between the opposite short sides of the casing.

5. An apparatus according to claim 4, wherein each cover unit is provided with an accompanying housing provided in a cross direction of the casing, which housings each support a roll for winding on and unwinding from the roll a web of each cover unit during its movement in a longitudinal direction of the casing.

6. An apparatus according to claim 5, wherein the housings of the cover units are provided with individual motors for movement of the housings along the casing for winding and unwinding respectively of the cover units.

7. An apparatus according to claim 3, wherein the cover units are comprised of a number of sleeves which are telescopically slidable for setting and moving said opening.

8. An apparatus according to claim 7, wherein the top side of the casing has a path for supporting a processing robot drivable along the path.

9. An apparatus according to claim 8, wherein the path is constituted by a beam running in a cross direction of the casing.

10. An apparatus according to claim 5, wherein air supply nozzles are provided at the cover units to direct supply air flow towards the opening.

11. An apparatus according to claim 3, wherein the apparatus is provided with sensors to control the positions of the cover units.

12. An apparatus according to claim 3, wherein lamps are provided on the side of the casing facing the plastic material application area, said lamps for lighting and/or curing purposes.

13. An apparatus according to claim 3, wherein the exhaust air terminal device is part of a closed air circuit with means for temperature control of circulated air at a completely closed position of the cover.

* * * * *

UNITED STATES PATENT AND TRADEMARK OFFICE
CERTIFICATE OF CORRECTION

PATENT NO. : 5,348,697
DATED : September 20, 1994
INVENTOR(S) : Palmers et al.

It is certified that error appears in the above-identified patent and that said Letters Patent is hereby corrected as shown below:

Column 4, line 38, "casing In" should read -- casing. In--.

Column 6, line 24, "a reinforced plastic" should read --a plastic--.

Signed and Sealed this

Twenty-eight Day of March, 1995

Attest:

BRUCE LEHMAN

Attesting Officer        *Commissioner of Patents and Trademarks*